(12) United States Patent
Lee et al.

(10) Patent No.: US 11,782,328 B2
(45) Date of Patent: Oct. 10, 2023

(54) CAMERA INCLUDING SOUND REDUCING MEMBER

(71) Applicant: SAMSUNG ELECTRO-MECHANICS CO., LTD., Suwon-si (KR)

(72) Inventors: Ik Sun Lee, Suwon-si (KR); Sang Jin Lee, Suwon-si (KR); Hwan Jun Kang, Suwon-si (KR); Jae Kyung Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 17/510,657

(22) Filed: Oct. 26, 2021

(65) Prior Publication Data

US 2023/0010659 A1 Jan. 12, 2023

(30) Foreign Application Priority Data

Jul. 6, 2021 (KR) .......................... 10-2021-0088198

(51) Int. Cl.
*G03B 17/12* (2021.01)
*G02B 27/64* (2006.01)
*H04N 23/55* (2023.01)

(52) U.S. Cl.
CPC .......... *G03B 17/12* (2013.01); *G02B 27/646* (2013.01); *H04N 23/55* (2023.01)

(58) Field of Classification Search
CPC ....................... G02B 7/04–105; G02B 27/646
See application file for complete search history.

(56) References Cited

U.S. PATENT DOCUMENTS

| | | | |
|---|---|---|---|
| 9,549,109 B2 * | 1/2017 | Kim | G02B 7/09 |
| 9,568,743 B2 | 2/2017 | Hayashi | |
| 2020/0348479 A1 | 11/2020 | Kwon et al. | |
| 2022/0113492 A1 * | 4/2022 | Chen | G02B 13/001 |
| 2022/0357548 A1 * | 11/2022 | Hsiao | G02B 7/005 |

FOREIGN PATENT DOCUMENTS

| | | |
|---|---|---|
| KR | 10-2016-0092668 A | 8/2016 |
| KR | 10-2020-0126873 A | 11/2020 |
| KR | 10-2020-0142876 A | 12/2020 |

* cited by examiner

*Primary Examiner* — Leon W Rhodes, Jr.
(74) *Attorney, Agent, or Firm* — NSIP Law

(57) ABSTRACT

A camera module includes: a housing; a first lens module movably disposed in the housing in an optical axis direction; a folded module including a reflective member configured to change a direction of light incident into the housing toward the first lens module; and a first damper coupled to the first lens module, and configured to alleviate impacts between the housing and the first lens module.

24 Claims, 6 Drawing Sheets

CAMERA INCLUDING SOUND REDUCING MEMBER

CROSS-REFERENCE TO RELATED APPLICATIONS

This application claims the benefit under 35 U.S.C. § 119(a) of Korean Patent Application No. 10-2021-0088198 filed on Jul. 6, 2021 in the Korean Intellectual Property Office, the entire disclosure of which is incorporated herein by reference for all purposes.

BACKGROUND

1. Field

The following description relates to a camera including a member for reducing a rattling sound. For example, the following description relates to a technology related to reducing or eliminating a rattling sound according to movement of a lens barrel in a zoom camera.

2. Description of Related Art

In recent years, cameras have been installed as standard equipment in portable electronic devices such as smartphones, tablet PCs, laptop computers, and the like. An autofocusing function (AF), an image stabilization function (OIS), a zoom function, and the like are being included in cameras for portable electronic devices.

A lens barrel may move in an optical axis direction to implement the autofocusing function (AF) and zoom function. When the lens barrel moves and collides with a housing of the camera, noise due to the collision may be generated. In order to alleviate such noise, a damper may be disposed at a portion where the lens barrel collides with a lens module.

However, when the damper is disposed in the housing, there is a problem in that a manufacturing process becomes complicated. For example, in order to mount a damper made of polyurethane on the housing, after the damper is inserted into a metal clip, and the clip is reinserted into the housing. For example, in the case of a camera for a mobile device, the size of the damper is very small, and, thus, a relatively sophisticated process is required to mount the damper inside the housing of the camera, which increases manufacturing costs and/or manufacturing time.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes: a housing; a first lens module movably disposed in the housing in an optical axis direction; a folded module including a reflective member configured to change a direction of light incident into the housing toward the first lens module; and a first damper coupled to the first lens module, and configured to alleviate impacts between the housing and the first lens module.

The first damper may be disposed in the optical axis direction.

The first damper may be disposed at two ends of the first lens module in the optical axis direction.

The camera module may further include a bracket coupled to the first lens module. The first damper may be coupled to the bracket.

The first damper may be coupled to two ends of the bracket.

The camera module may further include a magnet disposed on the bracket. The first damper may be disposed in a length direction of the magnet corresponding to the optical axis direction.

The bracket may include a side portion surrounding at least a portion of an end portion of the magnet in the optical axis direction. The first damper may be coupled to the side portion.

The camera module may further include a yoke disposed between the bracket and the magnet.

The camera module may further include a ball member disposed between the first lens module and the housing. The housing and the first lens module may include a guide groove configured to accommodate at least a portion of the ball member.

The camera module may further include: a second lens module movably disposed in the housing in the optical axis direction; and a second damper coupled to the second lens module, and configured to alleviate impacts between the housing and the second lens module.

The first damper and the second damper may be disposed opposite to each other such that an optical axis of the first lens module or the second lens module is disposed between the first damper and the second damper.

The second damper may be disposed at two ends of the second lens module in the optical axis direction.

The camera module may further include a bracket coupled to the second lens module. The second damper may be coupled to two ends of the bracket.

The camera module may further include a magnet disposed on the bracket. The second damper may be disposed in a length direction of the magnet corresponding to the optical axis direction.

The camera module may further include a ball member disposed between the first lens module and the second lens module. The first lens module and the second lens module may include a guide groove configured to accommodate at least a portion of the ball member.

The camera module may further include: a first magnetic member coupled to the housing; a second magnetic member coupled to the first lens module and facing the first magnetic member; and a third magnetic member coupled to the second lens module, and facing the first magnetic member.

In another general aspect, a camera module includes: a housing; a first lens module movably disposed in the housing in an optical axis direction; a first bracket coupled to the first lens module and extending in the optical axis direction; and a first damper coupled to two ends of the first bracket in the optical axis direction, and configured to alleviate impacts between the housing and the first lens module.

The camera module may further include: a second lens module disposed in the housing in such that the second lens module is movable the optical axis direction; a second bracket coupled to the second lens module and extending in the optical axis direction; and a second damper coupled to two ends of the second bracket in the optical axis direction, and configured to alleviate impacts between the housing and the second lens module.

The camera module may further include a ball member disposed between the first lens module and the second lens module.

The first damper and the second damper may be disposed opposite to each other such that an optical axis of the first lens module or the second lens module is disposed between the first damper and the second damper.

In another general aspect, a camera module includes: a housing; a lens module disposed in the housing; a magnet attached to a side of the lens module and configured to drive movement of the lens module in an optical axis direction; and a first damper disposed at a first end of the magnet in the optical axis direction, and configured to contact the housing in response to the movement of the lens module in the optical axis direction.

The camera module may further include a second damper disposed at a second end of the magnet opposing the first end of the magnet in the optical axis direction, and configured to contact the housing in response to the movement of the lens module in the optical axis direction.

The camera module may further include a bracket attaching the magnet to the side of the lens module, and retaining the first and second dampers at the first and second ends of the magnet, respectively.

The camera module may further include a yoke retained by the bracket.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
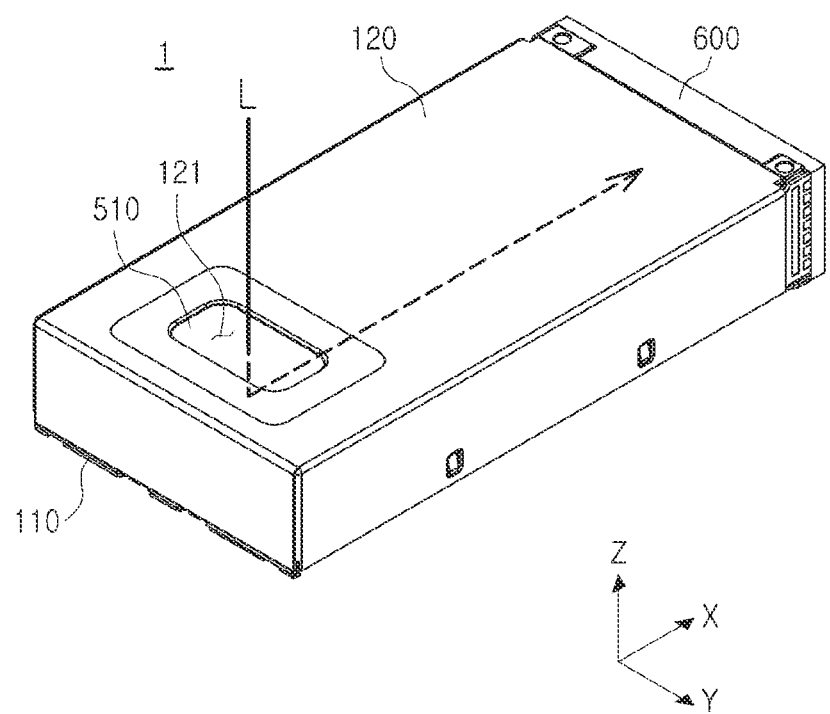
FIG. 1 is a perspective view of a camera module, according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is to be noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

In the disclosure herein, an X-direction, a Y-direction, and a Z-direction respectively indicate a direction parallel to an X-axis, a direction parallel to a Y-axis, and a direction parallel to a Z-axis, shown in the drawings. In addition, unless otherwise indicated, the X direction includes both a +X-axis direction and a −X-axis direction, the Y direction includes both a +Y-axis direction and a −Y-axis direction, and the Z direction includes both a +Z-axis direction and a −Z-axis direction.

Figure 2:
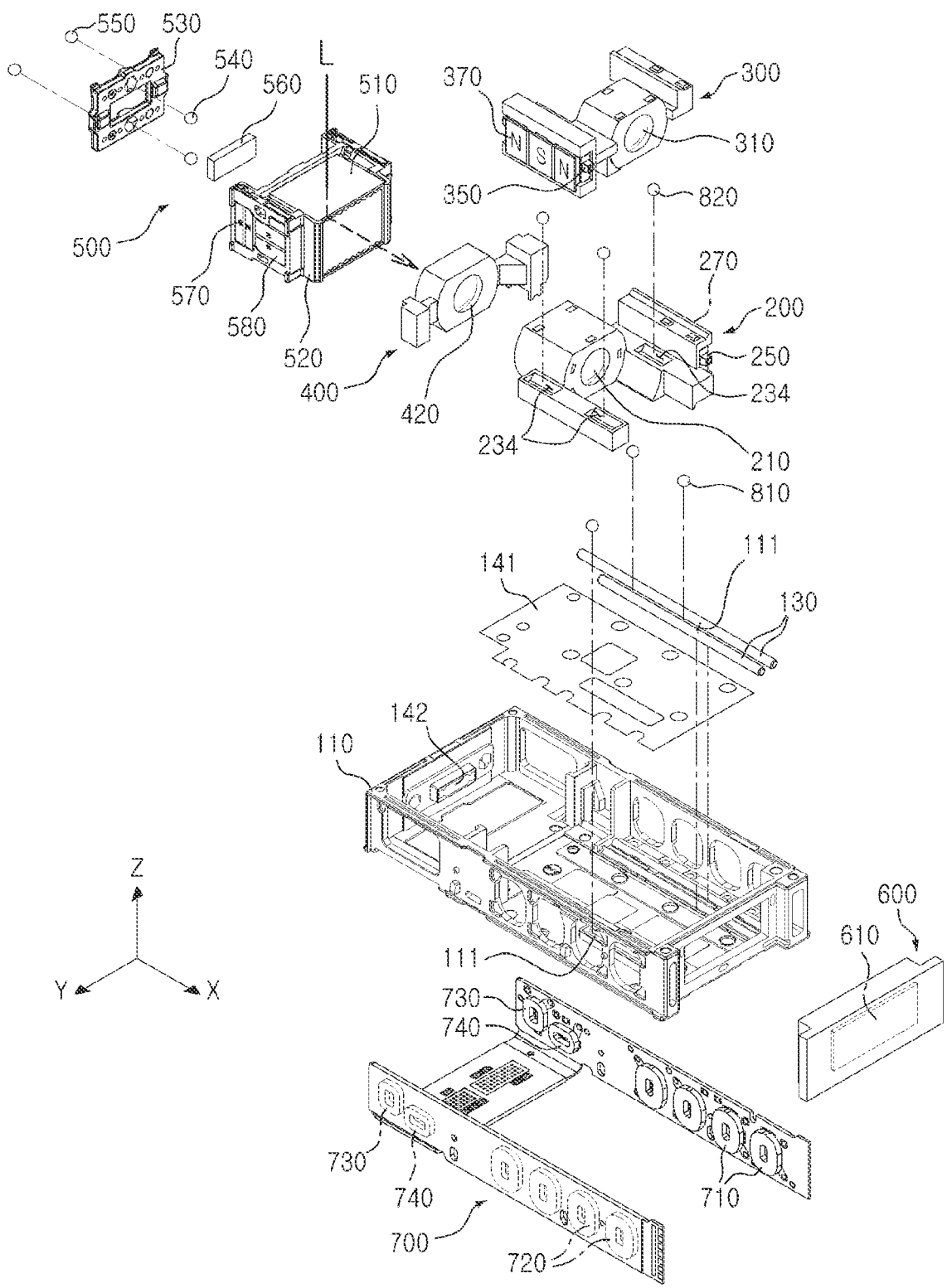
FIG. 2 is an exploded perspective view of the camera module of FIG. 1, according to an embodiment.
Figure 3:
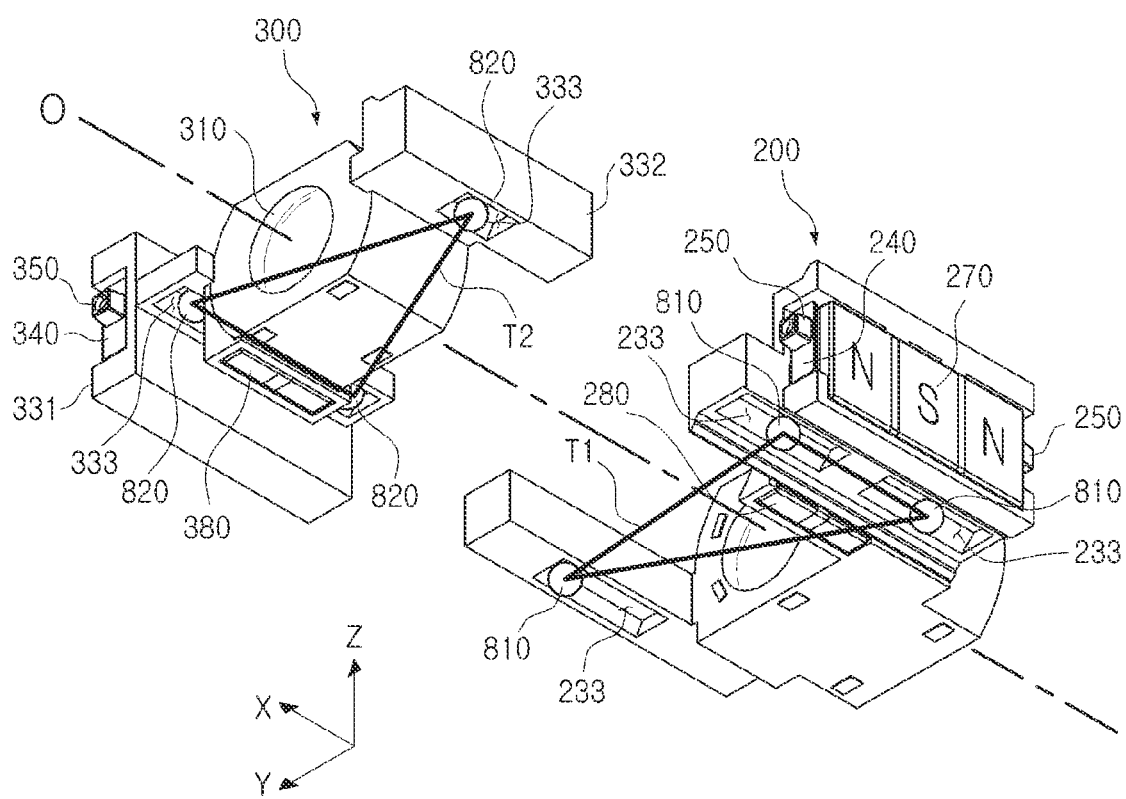
FIG. 3 is a rear perspective view of a first lens module and a second lens module of the camera module of FIG. 1, according to an embodiment.

FIG. 1 is a perspective view of a camera module 1, according to an embodiment. FIG. 2 is an exploded perspective view of the camera module 1. FIG. 3 is a rear perspective view of a first lens module 200 and a second lens module 300 of the camera module 1, according to an embodiment.

Referring to FIGS. 1 and 2, the camera module 1 may include, for example, a housing 110, the first lens module 200, the second lens module 300, a third lens module 400, a folded module 500, and a sensor module 600.

In an embodiment, the camera module 1 may include a plurality of lens modules. For example, the camera module 1 may include a first lens module 200, a second lens module 300, and a third lens module 400. The first, second, and third lens modules 200, 300, and 400 may respectively include at least one lens and a lens barrel accommodating the at least one lens. At least one lens module among the first, second, and third lens modules 200, 300, and 400 may move in an optical axis (O) direction to implement an automatic focusing adjustment function and a zoom function.

In an embodiment, all of the first, second, and third lens modules 200, 300, and 400 may move in an optical axis (O) direction with respect to the housing 110, or at least one of the first, second, and third lens modules 200, 300, and 400 may be fixed to the housing 110 so as not to move in the optical axis (O) direction with respect to the housing 110. The autofocusing function and zoom function can be implemented by the moving lens module 200/300/400. For example, the first lens module 200 and the second lens module 300 may move within a predetermined range in the optical axis (O) direction inside the housing 110, and the third lens module 400 may be fixedly coupled to the housing 110. In this case, a focus or magnification may be adjusted according to the movement of the first lens module 200 and the second lens module 300.

The sensor module 600 includes an image sensor 610 configured to convert light passing through the first, second, and third lens modules 200, 300, and 400 into an electrical signal, and a printed circuit board on which the image sensor 610 is mounted. The sensor module 600 may include an optical filter configured to filter light incident through the first, second, and third lens modules 200, 300, and 400. The optical filter may include an infrared cut filter, for example.

In an embodiment, the folded module 500 is configured to change a traveling direction of light. For example, a traveling direction of light incident through an opening 121 of a shield can 120 covering the camera module 1 from above may be changed to be directed toward the first, second, and third lens modules 200, 300, and 400 through the folded module 500. To this end, the folded module 500 may include an optical path changing member 510 configured to change a path of light. The optical path changing member 510 may include, for example, a mirror, a prism, a beam splitter, or the like.

In an embodiment, the first lens module 200 and the second lens module 300 are movably disposed in an internal space of the housing 110 in the optical axis (O) direction.

In an embodiment, first ball members 810 are disposed between the first lens module 200 and the housing 110, and the housing 110 and the first lens module 200 may include a first guide groove 111 and a second guide groove 233 (see FIG. 3) accommodating the first ball members 810, respectively. The first guide groove 111 and the second guide groove 233 may extend in the optical axis (O) direction, and may limit a degree of freedom of the first ball members 810 to the optical axis (O) direction. The first ball members 810 may move in the optical axis (O) direction along the first guide groove 111 and the second guide groove 233, and accordingly, the degree of freedom of the first lens module 200 with respect to the housing 110 may be limited to the optical axis (O) direction.

In an embodiment, the first guide groove 111 may be integrally formed with the housing 110, or may formed by another component coupled to the housing 110. For example, referring to FIG. 2, two guide rods 130, extending in parallel to each other in a state of being spaced apart from each other, may be coupled to the housing 110, and the first guide groove 111 may be defined by a space between the guide rods 130.

In an embodiment, second ball members 820 may be disposed between the first lens module 200 and the second lens module 300, and the first lens module 200 and the second lens module 300 may include a third guide groove 234 and a fourth guide groove 333 accommodating the second ball members 820, respectively. The third guide groove 234 and the fourth guide groove 333 may extend in the optical axis (O) direction, and may limit a degree of freedom of the second ball members 820 to the optical axis (O) direction. The second ball members 820 may move in the optical axis (O) direction along the third guide groove 234 and the fourth guide groove 333, and accordingly, a degree of freedom of the second lens module 300 with respect to the first lens module 200 (or the housing 110) may be limited to the optical axis (O) direction.

While the first lens module 200 and the second lens module 300 move in the optical axis (O) direction, the first ball member 810 and the second ball member 820 are kept in contact with the guide grooves corresponding thereto, such that the first lens module 200 and the second lens module 300 may smoothly move in the optical axis (O) direction, which helps to implement a stable magnification control function or a focus control function.

In an embodiment, the camera module 1 may include a pulling assembly configured to pull the first, second, and third lens modules 200, 300, and 400 to a bottom portion of the housing 110 for smooth operation of the first, second, and third lens modules 200, 300, and 400. For example, referring to FIGS. 2 and 3, the pulling assembly may include a first magnet member 280 coupled to a lower portion of the first lens module 200, and a third magnet member 141 disposed on a bottom of the housing 110. In an embodiment, the third magnet member 141 may be disposed such that the third magnet member 141 is inserted into the housing 110.

The first magnetic member 280 and the third magnetic member 141 are disposed to face each other, and are configured to generate magnetic attractive force between each other. For example, the first magnetic member 280 may be a magnet and the third magnetic member 141 may be a yoke. The attractive force between the first magnetic member 280 and the third magnetic member 141 pulls the first lens module 110 toward the bottom of the housing 110 (i.e., in a −Z direction) while the first lens module 200 moves in the optical axis (O) direction. Accordingly, the first ball members 810 are maintained in contact with the first guide groove 111 and the second guide groove 233, and the first lens module 200 may be smoothly moved in the optical axis (O) direction.

In an embodiment, the pulling assembly may also include a second magnetic member 380 coupled to a lower portion of the second lens module 300, and a third magnetic member 141 disposed on the bottom of the housing 110. The second magnetic member 380 and the third magnetic member 141 are disposed to face each other, and are configured to generate magnetic attractive force between each other. For example, the second magnetic member 380 may be a magnet and the third magnetic member 141 may be a yoke. The attractive force between the second magnetic member 380 and the third magnetic member 141 pull the second lens module 300 toward the bottom (i.e., in a —Z direction) of the housing 110 while the second lens module 300 moves in the optical axis (O) direction. Accordingly, the second ball members 820 are maintained in contact with the third guide groove 234 and the fourth guide groove 333, and the second lens module 300 may smoothly move in the optical axis (O) direction.

In an embodiment, pulling force between the magnetic members may be located inside a triangle made by three ball members supporting the lens module. In this case, while the lens module moves in the optical axis (O) direction, the three ball members can stably support the lens module, and accordingly, the movement in the optical axis (O) direction of the lens module can be performed more smoothly.

In an embodiment, the first magnetic member 280 may be disposed such that a resultant force of the pulling force between the third magnetic members 141 is located in an inner region of a triangle T1 formed by connecting the first ball members 810. For example, when viewed in a Z direction, the first magnetic member 280 may be located inside the triangle T1. For another example, when viewed in the Z direction, a geometric center or a center of mass of the first magnetic member 280 may be located inside the triangle T1.

In an embodiment, the first magnetic member 280 may be located close to a side of the triangle T1 disposed parallel to the optical axis (O). Accordingly, even if the first ball members 810 move along the first guide groove and the second guide groove 233, the pulling force does not deviate outside of the triangle T1, or even if the pulling force deviates to the outside of the triangle T1, the degree of the pulling force outside of the triangle T1 may be small.

In an embodiment, the second magnetic member 380 may be disposed so that a resultant force of attractive force between the third magnetic members 141 is located in an inner region of a triangle T2 formed by connecting the second ball members 820. For example, when viewed in a Z direction, the second magnetic member 380 may be located inside the triangle T2. For another example, when viewed in the Z direction, a geometric center or a center of mass of the second magnetic member 380 may be located inside the triangle T2.

In an embodiment, the second magnetic member 380 may be located close to a side of the triangle T2 disposed parallel to the optical axis (O). Accordingly, even if the second ball members 820 move along the third guide groove and the fourth guide groove 333, the pulling force does not deviate outside of the triangle T2 or the degree of the pulling force outside of the triangle T2 may be small.

In an embodiment, the camera module 1 may include a driving portion configured to move the first lens module 200 and the second lens module 300 in an optical axis (O) direction. For example, the first lens module 200 includes a first magnet 270 that faces a first coil 710 fixedly coupled to the housing 110. For example, the first coil 710 is attached to a substrate 700 coupled to the housing 110, and faces the first magnet 270 in a Y direction. The first magnet 270 and the first coil 710 form a part of the driving portion. Due to the electromagnetic interaction between the first magnet 270 and the first coil 710, the first lens module 200 may move in the optical axis (O) direction. In another embodiment, the first coil 710 may be coupled to the first lens module 200, and the first magnet 270 may be coupled to the housing 110.

In an embodiment, the first magnet 270 is magnetized in a form in which N poles and S poles are alternately arranged in the optical axis (O) direction, and one or more first coils 710 may be arranged along the optical axis (O) direction. Referring to FIGS. 2 and 3, the first magnet 270 may have a form in which an N pole, an S pole, and an N pole are sequentially arranged, and the first coil 710 is composed of four coils, but this is merely an example. In another embodiment, a magnetizing pattern of the first magnet 270 or the number of the first coils 710 may be configured in various ways.

In an embodiment, the second lens module 300 includes a second magnet 370 and faces a second coil 720 fixedly coupled to the housing 110. For example, the second coil 720 is attached to a substrate 700 coupled to the housing 110, and faces the second magnet 370 in a Y direction. The second magnet 370 and the second coil 720 form another part of the driving portion. Due to the electromagnetic interaction between the second magnet 370 and the second coil 720, the second lens module 300 may move in the optical axis (O) direction. In another embodiment, the second coil 720 may be coupled to the second lens module 300, and the second magnet 370 may be coupled to the housing 110.

In an embodiment, the second magnet 370 is magnetized in a form in which N poles and S poles are alternately arranged in an optical axis (O) direction, and one or more second coils 720 may be arranged along the optical axis (O) direction. Referring to FIGS. 2 and 3, the second magnet 370 may have a form in which N poles, S poles, and N poles are sequentially arranged, and the second coil 720 is composed of four coils, but this is merely an example. In another embodiment, a magnetizing pattern of the second magnet 370 or the number of the second coil 720 may be configured in various ways.

Referring to FIG. 2, the folded module 500 may include the optical path changing member 510 and a rotating holder 520 accommodating the optical path changing member 510. A third ball member 540, a rotating plate and a fourth ball member 550 may be disposed between an inner wall surface of the housing 110 and the rotating holder 520.

The rotating holder 520 and the housing 110 may include a fourth magnetic member 560 and a fifth magnetic member 142 on opposing surfaces, respectively, and the rotating holder 520 may be supported by the housing 110 by attractive force between the fourth magnetic member 560 and the fifth magnetic member 142. The fourth magnetic member 560 and the fifth magnetic member 142 may be a pulling yoke and a pulling magnet. For example, the fourth magnetic member 560 and the fifth magnetic member 142 may selectively be a pulling yoke or a pulling magnet, or both fourth magnetic member 560 and the fifth magnet member 142 may be pulling magnets.

The folded module 500 may correct user hand-shake by moving the rotating holder 520, on which the optical path changing member 510 is mounted. The rotating holder 520 may be accommodated in the housing 110 to be rotatable, centered on first and second axes perpendicular to the optical axis (O). The first axis and the second axis may be an axis, perpendicular to the optical axis (O), and the first axis and the second axis may be axes that are mutually perpendicular. For example, the first axis may be parallel to the Z axis shown in the drawings, and the second axis may be parallel to the Y axis shown in the drawings.

Referring to FIG. 2, the rotating plate may be supported by the fourth ball member 550 and may be tilted with respect to the housing 110 centered on the Y-axis. The rotating holder 520 may be supported by the third ball member 540, and may be tilted with respect to the rotating plate centered on the Z axis. For example, the rotating holder 520 can be tilted with respect to the housing 110, centered on the X-axis and the Y-axis. Thus, a shake correction function can be implemented.

The camera module 1 may include a driving portion configured to rotate the folded module 500 centered on a first axis or a second axis. The driving portion for the folded module 500 may include a plurality of magnets and a plurality of coils. For example, the driving portion for the folded module 500 may include a third magnet 570 and a fourth magnet 580, and a third coil 730 and a fourth coil 740 disposed to face the third magnet 570 and the fourth magnet 580, respectively.

The third magnet 570 may be disposed on both sides of the rotation holder 520 in the Y direction, and the third coil 730 may be disposed to face the third magnet 570. Due to electromagnetic interaction between the third magnet 570 and the third coil 730, the rotation holder 520 may rotate centered on an axis (e.g., Y axis) perpendicular to the optical axis (O).

The fourth magnet 580 may be disposed on both sides of the rotation holder 520 in the Y direction, and the fourth coil 740 may be disposed to face the fourth magnet 580. Due to electromagnetic interaction between the fourth magnet 580 and the fourth coil 740, the rotation holder 520 may rotate centered on an axis (e.g., Y axis) perpendicular to the optical axis (O).

In an embodiment, the camera module 1 may include a position sensor configured to measure a position of the first lens module 200 and the second lens module 300 in the optical axis (O) direction or a degree of tilt of the rotation holder 520. The position sensor may be coupled to the substrate 700, and may be located inside or outside the first to fourth coils 710, 720, 730, and 740. The position sensor may include a magnetic sensor. For example, the position sensor may include a hall sensor and a magnetoresistive sensor. The magnetoresistance sensor may include an anisotropic magnetoresistive sensor, a giant magnetoresistive sensor, or a tunnel magnetoresistive sensor.

Figure 4:
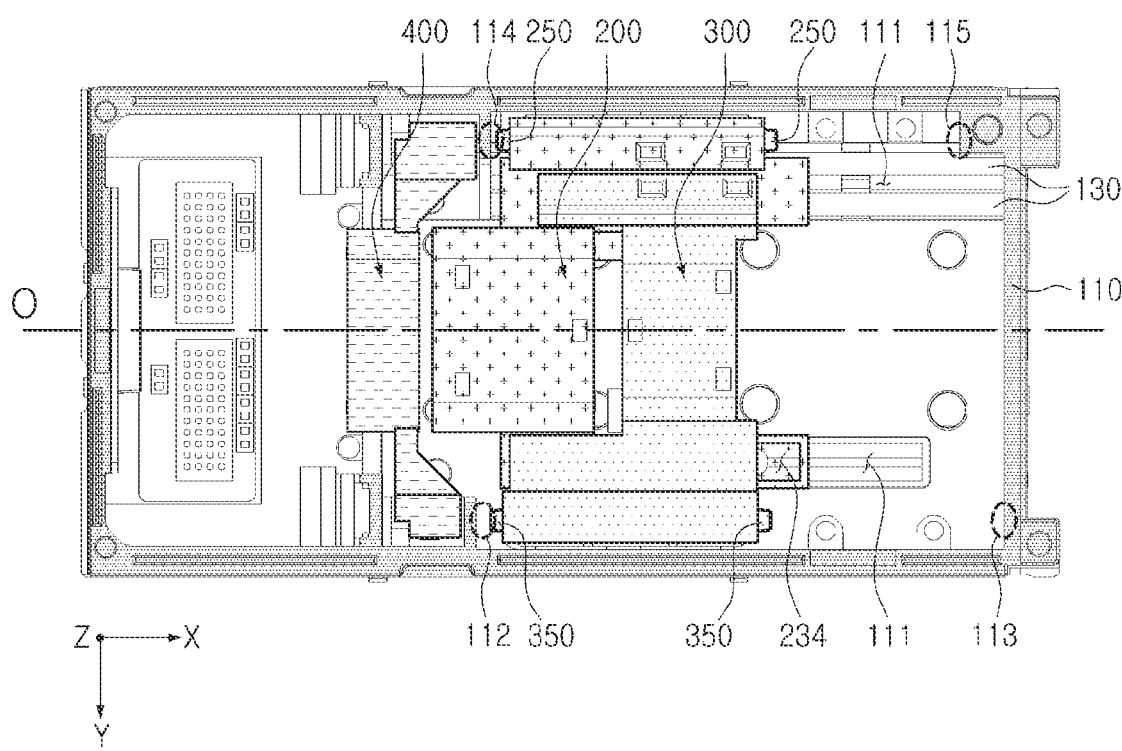
FIG. 4 is a top view of an inside of the camera module of FIG. 1, according to an embodiment.
Figure 5:
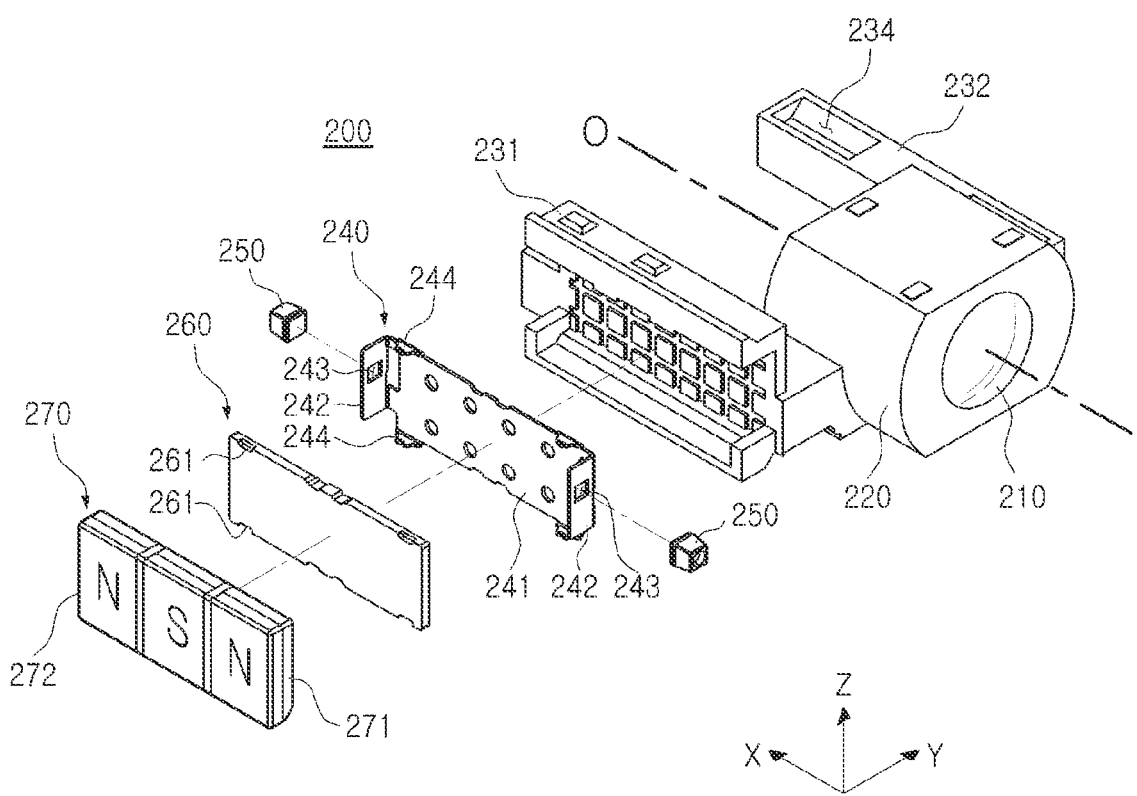
FIG. 5 is an exploded perspective view of the first lens module, according to an embodiment.
Figure 6:
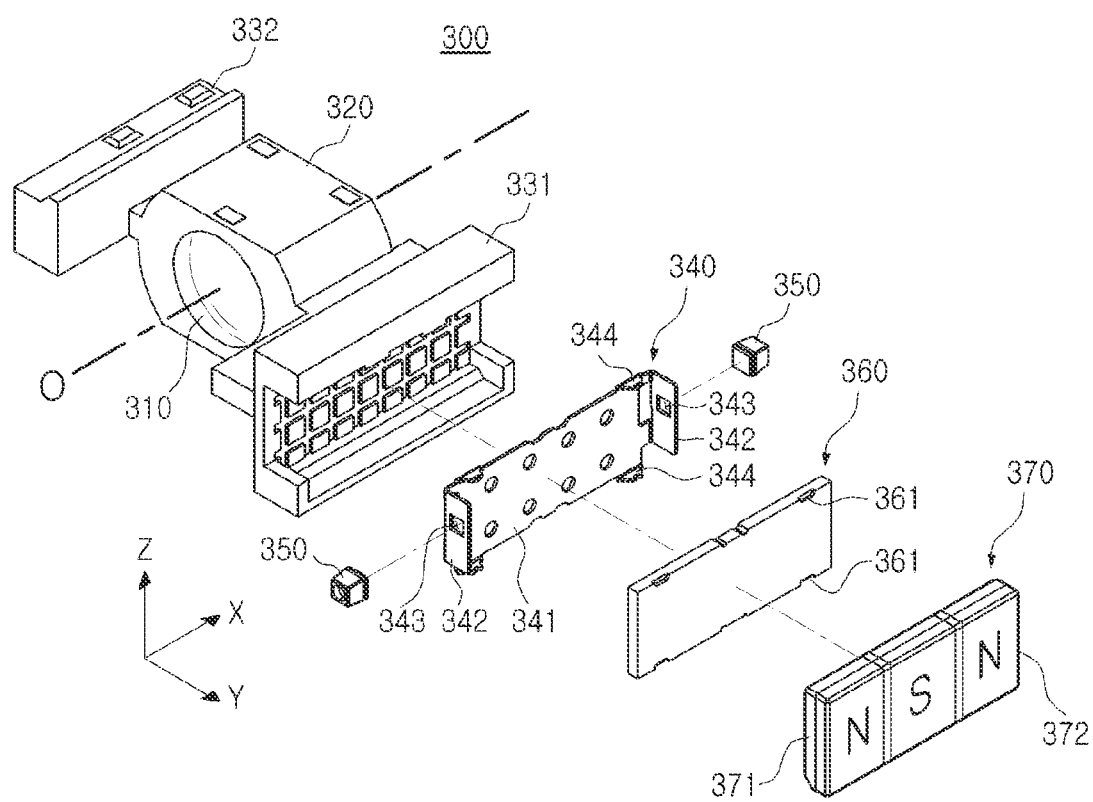
FIG. 6 is an exploded perspective view of the second lens module, according to an embodiment.

FIG. 4 is a top view of an inside of the camera module 1 according to an embodiment. FIG. 5 is an exploded perspective view of the first lens module 200, according to an embodiment. FIG. 6 is an exploded perspective view of the second lens module 300, according to an embodiment.

Referring to FIGS. 3 to 6, a movement range of the first and second lens modules 200 and 300 may be limited by the first and second lens modules 200 and 300 colliding with an inner wall of the housing 110. Referring to FIG. 4, the first lens module 200 collides with a first portion 112 of the housing 110 when the first lens module 200 moves maximally in an −X direction, and the first lens module 200 collides with a second portion 113 of the housing 110, and when the first lens module 200 moves maximally in an +X direction. The second lens module 300 collides with a third portion 114 of the housing 110 when the second lens module 300 moves maximally in an −X direction, and the second lens module 300 collides with a fourth portion 115 of the housing 110 when the second lens module 300 moves maximally in an +X direction.

A rattling sound may be generated by impacts when the first and second lens modules 200 and 300 collide with the housing 110. In order to prevent or minimize the rattling sound, in an embodiment, the first and second lens modules 200 and 300 may include first and second dampers 250 and 350 configured to alleviate impacts between the first and second lens modules 200 and 300 and the housing 110.

In an embodiment, the first and second lens modules 200 and 300 may include the first and second dampers 250 and 350, respectively, at portions in contact with the housing 110. For example, the first lens module 200 may include the first damper 250 in contact with the first portion 112 and the second portion 113, respectively. The first damper 250 is disposed so as to be in first contact with an inner wall of the housing 110 when the first lens module 200 moves. For example, the first damper 250 may be disposed at both ends of the first lens module 200 in the optical axis (O) direction.

The second lens module 300 may include the second damper 350 in contact with the third portion 114 and the fourth portion 115, respectively. The second damper 350 is disposed so as to be in first contact with an inner wall of the housing 110 when the second lens module 300 moves. For example, the second damper 350 may be disposed at both ends of the second lens module 300 in the optical axis (O) direction.

In an embodiment, the first and second dampers 250 and 350 may include a material capable of absorbing impacts. For example, the first and second dampers 250 and 350 may include a material such as sponge, silicone, rubber, polyurethane, or the like. In an embodiment, the dampers 250 and 350 may include a structure that is easily elastically deformed. In this case, the impacts between the first and second lens modules 200 and 300 and the housing 110 can be alleviated while the first and second dampers 250 and 350 are elastically deformed. For example, the first and second dampers 250 and 350 may have a form of a coil spring or a leaf spring.

Referring to FIG. 5, the first lens module 200 may include at least one lens 210, a first lens barrel 220 accommodating at least one lens 210, and first and second support parts 231 and 232 configured to guide and support the movement of the first lens barrel 220 in the optical axis (O) direction.

For example, the first lens module 220 may include the first support part 231 and the second support part 232 respectively disposed on both sides of the first lens barrel 220. Referring to FIG. 3, the second guide groove 233 is disposed below the first support part 231 and the second support part 232, and two of the first ball members 810 support the first support part 231, and the other one of the first ball members 810 supports the second support part 232.

In an embodiment, the first support part 231 and the second support part 232 may be formed integrally with the first lens barrel 220, or may be formed as separate members that are coupled to the first lens barrel 220.

In an embodiment, a first bracket 240 may be coupled to the first support part 231. The first damper 250 may be coupled to both ends of a first bracket 240. In an embodiment, the first bracket 240 may include a first base 241 extending in the optical axis (O) direction (i.e., the X direction) and a first side portion 242 extending in the —Y direction at both ends of the first base 241, respectively. The first damper 250 may be coupled to the first side portion 242. For example, the first side portion 242 may define a first accommodating portion 243, and the first damper 250 may be fitted into the first accommodating portion 243.

In an embodiment, a first magnet 270 may be disposed on the first bracket 240. In an embodiment, a first back yoke 260 may be disposed between the first magnet 270 and the first bracket 240. The first back yoke 260 allows a magnetic field of the first magnet 270 to be concentrated in a direction (i.e., a −Y direction) toward the first coil 710. In an embodiment, the first bracket 240 may include a first hook 244 extending from the first base 241, and the first back yoke 260 may include a first locking portion 261 locked in the first hook 244.

In an embodiment, the first magnet 270 may have a length in the optical axis (O) direction, and the first damper 250 may be disposed in a direction of the length of the first magnet 270 corresponding to the optical axis (O) direction. For example, the first damper 250 may be positioned at both ends of the first magnet 270. In an embodiment, the first side portion 242 may at least partially surround both ends of the first magnet 270 in the optical axis (O) direction, and the first damper 250 may be coupled to the first side portion 242, such that the first damper 250 may be positioned at both ends of the first magnet 270 in the optical axis (O) direction.

Since the first lens module 200 receives driving force in the optical axis (O) direction through the first magnet 270, when the first lens module 200 collides with the housing 110, a portion that is close to the first magnet 270, may be the most affected. In an embodiment, the first damper 250 may be disposed in the length direction of the first magnet 270 corresponding to the optical axis (O) direction, which may effectively alleviate the impact between the first lens module 200 and the housing 110.

Referring to FIG. 6, the second lens module 300 may include at least one lens 310, a lens barrel 320 accommodating the at least one lens 310, and third and fourth support parts 331 and 332 configured to guide and support the second lens barrel 320 in the optical axis (O) direction.

For example, the second lens module 300 may include the third support part 331 and the fourth support part 332 respectively disposed on both sides of the second lens barrel 320. Referring to FIG. 3, the second guide groove 233 may be provided below the third support part 331 and the fourth support part 332, and two of the second ball members 820 support the third support part 331 and the other one of the second ball members 830 supports the fourth support part 332.

In an embodiment, the third support part 331 and the fourth support part 332 may be provided formed with the second lens barrel 320, or may be formed as separate members that are coupled to the second lens barrel 320.

In an embodiment, a second bracket 340 may be coupled to the third support part 331. The second damper 350 may be coupled to both ends of the second bracket 340. In an embodiment, the second bracket 340 may include a second base 341 extending in the optical axis (O) direction (i.e., an X direction) and a second side portion 342 extending in a +Y direction from both ends of the second base 341, respectively. The second damper 350 may be coupled to the second side portion 342. For example, the second side portion 342 may define a second accommodating portion 343, and the second damper 350 may be fitted into the second accommodating portion 343.

In an embodiment, a second magnet 370 may be disposed on the second bracket 340. In an embodiment, a second back yoke 360 may be disposed between the second magnet 370 and the second bracket 340. The second back yoke 360 allows a magnetic field of the second magnet 370 to be concentrated in a direction (i.e., +Y direction) toward the second coil 720. In an embodiment, the second bracket 340 may include a second hook 344 extending from the second base 341, and the second back yoke 360 may include a second locking portion 361 locked in the second hook 344.

In an embodiment, the second magnet 370 may have a length in the optical axis (O) direction, and the second damper 350 may be disposed in a direction of the length of the second magnet 370 corresponding to the optical axis (O) direction. For example, the second damper 350 may be positioned at both ends of the second magnet 370. In an embodiment, the second side portion 342 may at least partially surround both ends of the second magnet 370 in the optical axis (O) direction, and the second damper 350 may be coupled to the second side portion 342, such that the second damper 350 may be positioned at both ends of the second magnet 370 in the optical axis (O) direction.

Since the second lens module 300 receives driving force in the optical axis (O) direction through the second magnet 370, when the second lens module 300 collides with the housing 110, a portion that is close to the second magnet 370 may be the most affected. In an embodiment, the second damper 350 may be disposed in the length direction of the second magnet 370 corresponding to the optical axis (O) direction, which may effectively alleviate impacts between the second lens module 300 and the housing 110.

In an embodiment, the first damper 250 and the second damper 350 are disposed opposite to each other with respect to the optical axis (O). For example, referring to FIG. 4, the first damper 250 may be disposed in the −Y direction with respect to the optical axis (O), and the second damper 350 may be disposed in the +Y direction with respect to the optical axis (O).

According to an embodiment, the first and second dampers 250 and 350 are directly and fixedly coupled to the first and second lens modules 200 and 300, to prevent or minimize the rattling sound. Conventionally, a damper is coupled to the housing of the camera module to alleviate the impact with the lens module. In this case, a process of installing the damper to the housing is not efficient. This is because it was necessary to install a damper inside the housing for each portion colliding with the lens module. For example, referring to FIG. 4, the first and second dampers 250 and 350 should be mounted to the first to fourth portions 112, 113, 114, and 115, respectively.

According to the embodiments disclosed herein, since the first and second dampers 250 and 350 are coupled to the lens modules 200 and 300, a cumbersome process of installing the damper to the housing 110 may be omitted. Since an internal structure of the housing 110 is relatively complicated, the process of installing the damper on an inner wall of the housing 110 must be performed delicately, which is a factor greatly reducing the efficiency of the process. However, since a process in which the first and second dampers 250 and 350 are disposed on an outside of the lens modules 200 and 300 is relatively easy, an efficiency of an installation process of the first and second dampers 250 and 350 may be greatly improved, as compared to conventional processes of installing dampers to a housing. For example, according to an embodiment, the first and second dampers 250 and 350 may be fitted to both ends of the first and second brackets 240 and 340, and then coupled to the first and second lens modules 200 and 300, which may reduce components necessary for installing the damper, as compared to the conventional art.

As set forth above, according to embodiments disclosed herein, a rattling sound generated inside the camera may be effectively eliminated or alleviated. In addition, an efficiency of a process of mounting a member for reducing a rattling sound in the camera may be greatly improved.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
   a housing;
   a first lens module including a first support part and a second support part, and disposed in the housing to be movable in an optical axis direction;
   a folded module including a reflective member configured to change a direction of light incident into the housing toward the first lens module; and
   a first damper coupled to the first support part, and configured to alleviate impacts between the housing and the first lens module.

2. The camera module of claim 1, wherein the first damper is disposed in the optical axis direction.

3. The camera module of claim 1, wherein the first damper is disposed at two ends of the first lens module in the optical axis direction.

4. The camera module of claim 1, further comprising a bracket coupled to the first lens module,
   wherein the first damper is coupled to the bracket.

5. The camera module of claim 4, wherein the first damper is coupled to two ends of the bracket.

6. The camera module of claim 5, further comprising a magnet disposed on the bracket,
   wherein the first damper is disposed in a length direction of the magnet corresponding to the optical axis direction.

7. The camera module of claim 6, wherein the bracket comprises a side portion surrounding at least a portion of an end portion of the magnet in the optical axis direction,
   wherein the first damper is coupled to the side portion.

8. The camera module of claim 6, further comprising a yoke disposed between the bracket and the magnet.

9. The camera module of claim 1, further comprising:
   a ball member disposed between the first lens module and the housing,
   wherein the housing and the first lens module include a guide groove configured to accommodate at least a portion of the ball member.

10. The camera module of claim 1, further comprising:
    a second lens module disposed in the housing such that the second lens module is movable in the optical axis direction; and
    a second damper coupled to the second lens module, and configured to alleviate impacts between the housing and the second lens module.

11. The camera module of claim 10, wherein the first damper and the second damper are disposed opposite to each other such that an optical axis of the first lens module or the second lens module is disposed between the first damper and the second damper.

12. The camera module of claim 10, wherein the second damper is disposed at two ends of the second lens module in the optical axis direction.

13. The camera module of claim 12, further comprising:
    a bracket coupled to the second lens module,
    wherein the second damper is coupled to two ends of the bracket.

14. The camera module of claim 13, further comprising:
    a magnet disposed on the bracket,
    wherein the second damper is disposed in a length direction of the magnet corresponding to the optical axis direction.

15. The camera module of claim 10, further comprising:
    a ball member disposed between the first lens module and the second lens module,
    wherein the first lens module and the second lens module include a guide groove configured to accommodate at least a portion of the ball member.

16. The camera module of claim 10, further comprising:
    a first magnetic member coupled to the housing;
    a second magnetic member coupled to the first lens module and facing the first magnetic member; and
    a third magnetic member coupled to the second lens module, and facing the first magnetic member.

17. A camera module, comprising:
    a housing;
    a first lens module including a first support part and second support part, and disposed in the housing to be movable in an optical axis direction;
    a first bracket coupled to the first support part and extending in the optical axis direction; and
    a first damper coupled to two ends of the first bracket in the optical axis direction, and configured to alleviate impacts between the housing and the first lens module.

18. The camera module of claim 17, further comprising:
    a second lens module disposed in the housing such that the second lens module is movable in the optical axis direction;
    a second bracket coupled to the second lens module and extending in the optical axis direction; and
    a second damper coupled to two ends of the second bracket in the optical axis direction, and configured to alleviate impacts between the housing and the second lens module.

19. The camera module of claim 18, further comprising a ball member disposed between the first lens module and the second lens module.

20. The camera module of claim 18, wherein the first damper and the second damper are disposed opposite to each other such that an optical axis of the first lens module or the second lens module is disposed between the first damper and the second damper.

21. A camera module, comprising:
a housing;
a lens module including a first support part and a second support part, and disposed in the housing;
a magnet attached to a side of the first support part and configured to drive movement of the lens module in an optical axis direction; and
a first damper disposed at a first end of the magnet in the optical axis direction, and configured to contact the housing in response to the movement of the lens module in the optical axis direction.

22. The camera module of claim 21, further comprising a second damper disposed at a second end of the magnet opposing the first end of the magnet in the optical axis direction, and configured to contact the housing in response to the movement of the lens module in the optical axis direction.

23. The camera module of claim 22, further comprising a bracket attaching the magnet to the side of the lens module, and retaining the first and second dampers at the first and second ends of the magnet, respectively.

24. The camera module of claim 22, further comprising a yoke retained by the bracket.

\* \* \* \* \*